Feb. 16, 1960

H. L. RITZ

2,925,254

REGENERATORS

Filed June 2, 1953

Feb. 16, 1960     H. L. RITZ     2,925,254
REGENERATORS Filed June 2, 1953     12 Sheets-Sheet 2

Feb. 16, 1960  H. L. RITZ  2,925,254
REGENERATORS
Filed June 2, 1953  12 Sheets-Sheet 11

United States Patent Office 2,925,254
Patented Feb. 16, 1960

2,925,254

REGENERATORS

Heinrich Ludolf Ritz, Newcastle upon Tyne, England, assignor to C. A. Parsons & Company Limited, Newcastle upon Tyne, England Application June 2, 1953, Serial No. 359,182

Claims priority, application Great Britain June 12, 1952

14 Claims. (Cl. 257—267)

Heat exchangers may be divided into two classes, namely recuperators and regenerators. In the former class, namely recuperators, fluids in heat exchanging relationship flow in separate chanels or ducts, which form an effective heat exchanging part or matrix, and through the walls of which heat transfer takes place between the said fluids. In the latter class, namely regenerators, the matrix consists of a heat accumulating mass which is subjected to each of the heat exchanging fluids in turn for short periods, heat being absorbed from the heat releasing fluid and imparted to the heat absorbing fluid. While both types of heat-exchangers may theoretically be made equivalent in terms of their thermodynamic behaviour, the practical difference between them results from the problem of sealing or keeping separate the fluids involved in the exchange of heat, which are usually at different pressures.

In the recuperator type often the whole, or at any rate an appreciable portion of the surface entering into the heat exchange process, is subjected to the pressure-difference between the fluids involved in the exchange of heat, and this imposes considerable restrictions on the internal construction and the selection of materials.

In the case of the regenerator type, each matrix portion of which is, at any one time, only subjected to the flow of one of the fluids involved in the exchange of heat, and therefore uniformly to its pressure, there is practically unlimited freedom in these respects, with the result that the matrices can be made much smaller, lighter and cheaper than the matrices of thermodynamically equivalent recuperators. Whether this results in a more advantageous heat exchanger is a matter which depends on the construction of the reversing mechanism which controls the periodical change of fluid flow through the matrix and provides the sealing of the two fluids in the regenerator, this being especially the case when the pressures of the two heat exchanging fluids differ appreciably from each other and the temperatures on the hot fluid side are comparatively high as is the case for example with gas turbine plants—a case to which the present invention especially relates.

If, as in the majority of regenerators used so far, the reversing mechanism takes the form of conventional valves located at a greater or lesser distance from the matrix, the non-productive expansion of the fluids when they are of gaseous form, enclosed between the matrix and the reversing mechanism and their mixing with quantities of gas of different temperatures, means a considerable thermodynamic loss, especially when this reversal takes place at short intervals of time. Longer change-over periods, however, involve the use of a matrix of greater thermal storage capacity, that is, of greater weight and bulk and this means the sacrifice, in part at least, of the main advantage of the regenerator.

The smallest dead spaces between reversing mechanism and matrix are obtained by making the terminal surface of the matrix itself one of the two sealing surface walls of the reversing mechanism; this leads to the forms of disc and drum type regenerators in which the matrix, built up in the form of discs or drums, is steadily rotated through successive walls separating the hot and cold gas sides of the heat exchanger and forming a labyrinth seal with the matrix, or resting and sliding on its surface thus forming a sliding seal.

Experience has shown that it is hardly possible to provide an effective seal on a matrix of fine structure which is also subjected to large changes and differences in temperature, a fact which results in the matrix being inserted in drum-shaped or disc-shaped rotors having radial dividing walls to form chambers which house the matrix and the single chambers of which are steadily rotated through the seals between the hot fluid side and the cold fluid side which, when in use with gas turbine plant, are also the low pressure and high pressure sides respectively of the regenerator, these seals being widened to suit the dimensions of the chambers.

Many sliding seal proposals or arrangements consist of sealing shoes fixed to the casing of the regenerator, and sliding on the surface of the rotor.

There are serious drawbacks in an arrangement of this kind which have hitherto made a satisfactory solution impracticable. One of these drawbacks is that the time during which each of these chambers remains partly or wholly covered between the sealing shoes during the change-over period cannot be made as short as desired, since their movement depends on the rotation of the rotor the slow speed of which is governed by thermodynamic conditions. Furthermore, the chambers formed by the introduction of radial dividing walls necessitate that the sealing shoes fitted to the casing must be made much larger than the effectual sealing length actually required, and that each of them must be able to cover completely at least one chamber of the rotor so as to ensure that there is always one of the radial dividing walls of the rotor between two opposing sealing shoes whilst the chambers are revolving. Since four pairs of sealing shoes must usually be provided in order to achieve an acceptable temperature symmetry at the circumference of the rotor, the portion of the rotor covered by them and inaccessible to the heat exchanging fluids is considerable which represents a loss. To keep this loss within reasonable limits, the width of the chambers must be kept as small as possible, and this involves a large number of dividing walls having sealing surfaces at their ends which, in turn, take up a large portion of the rotor and complicate the structure and, in particular, the fitting, sealing and changing of the matrix. As the number of dividing walls is limited, the sealing shoes cannot be made wide enough to cover several chambers of the rotor at the same time. This involves a further serious disadvantage in that when a chamber enters a seal from the high pressure side of the regenerator, the full pressure of the fluid contained therein acts underneath the sealing surface and a correspondingly high counter pressure must be exerted to ensure contact when seals of the sliding types are used. This counter pressure, which must exceed the maximum working pressure occurring, still acts to the full extent on the seal but is uncompensated when the chamber comes in communication with the low-pressure side, and this results in considerable friction and wear. Attempts made to provide an automatic pressure-compensating arrangement for the seal have resulted in complicating the latter.

A considerable part of the leakage occurring in disc and drum type regenerators is caused by the fact that the seals acting on the circumferential face must abut against the seals acting on the face in a plane at right angles to the axis of rotation and as the seals are subject to different temperatures, expansions and pressures, leakage occurs at these junctions. The optimum sealing contour from a prevention of leakage point of view would be continuous or circular but this type of contour is not obtainable with these types of regenerator.

A further disadvantage of these types is the excessive wear when seals of the sliding type are used as the rotor is in sliding contact with the seals continuously due to its continuous rotation. The most serious drawback of regenerators of this type is, however, that temperature differences and asymmetries occur in their casings and rotors causing expansions and distortions which the sealings cannot follow and at the same time maintain their effectiveness.

The object of the present invention is to provide a regenerator capable of providing a high degree of heat exchange between fluids of different pressures, in which the temperatures caused by inflowing and outflowing hot and cold fluids occur in a steady sequence in terms of space, in which thermal asymmetries are avoided, in which all seals have the optimum, that is a circular, contour, in which the pressures on the sliding surfaces and sliding lengths are small, in which the pressures exerted by the fluids on the moving parts can be arranged in such a manner that they completely counterbalance each other, in which sliding sealings can be entirely dispensed with in the region of high temperatures, and in which the time taken to transfer a portion of the matrix from one fluid side to the other is short and independent of the period for which the matrix must be subjected to the fluid stream.

The invention consists in a regenerative heat exchanger that is to say one in which a heat accumulating mass or matrix is subjected alternately to fluids in heat exchange relationship absorbing heat during its contact with a hot fluid and then giving it up during its contact with a cold fluid, in which the matrix is housed in a cylindrical casing which contains a piston or sleeve valve arrangement on either side of the matrix for the purpose of controlling the flow of the heat exchanging fluids through the matrix, by covering and uncovering ports in the cylinder or cylinders housing the valve arrangement.

The invention also consists in improved regenerators substantially as described below especially as indicated in the claims.

Referring to the accompanying diagrammatic drawings which illustrate the application of the invention in one form to gas turbine plants in which the heat exchanging fluids are gaseous and at different pressures.

Figure 1:
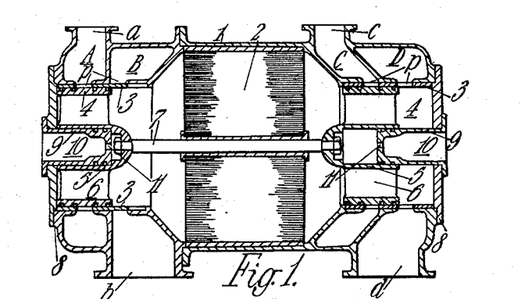
Figures 1 and 2 illustrate the principle and effects of the invention.

In Figure 1 a cylindrical casing 1 contains in its middle a stationary matrix 2, and at each of its ends two annular chambers A, B and C, D respectively. Each of these four annular chambers has, at its outside circumference, passages $a$, $b$, $c$ and $d$ respectively for the inlet and outlet of the gases, and at its inside circumference an annulus of ports or a single annular port $p$. In each of the cylindrical portions surrounded by the annular chambers is fixed a liner 3 with ports coinciding with ports $p$ on the inside of which slides, with very small clearance, a cylindrical valve body or piston consisting of an outside ring 4, an inside ring 5 closed at one end, and ribs 6 connecting the two rings. The two valves are connected to one another by rod 7. The casing 1 is closed at both ends by plates 8, in the middle of each of which is inserted a stationary piston 9 which projects with slight clearance into the inner cylinder 10 of the valve body. The twin valve can be moved from one end position to the other by feeding the chambers 10, formed by the valve bodies and pistons, alternately with compressed air through compressed air connections 11.

Figure 2:
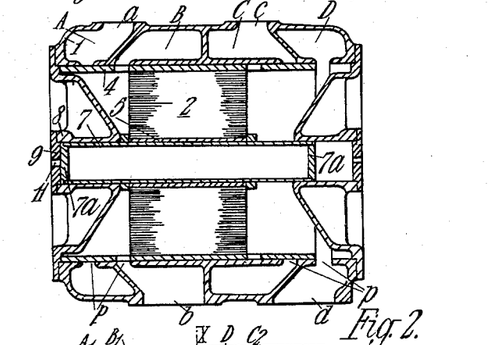

The regenerator shown in Figure 2 is the same in principle.

The four annular chambers A, B, C and D form in this case, at their inside circumference a continuous cylinder inside of which the valve body slides. The valve body consists of an inner ring 5 and an outer ring 4. The matrix 2 is housed between these two rings and is displaceable with them. The outer ring is connected to the inner ring through the matrix if its rigidity permits or by radial ribs. The inner ring 5 is connected to rod 7 which in this case takes the form of a tube the ends of which are closed by end plates 7a. End plates 8, in this case conical in form, are fixed to casing 1, and form cylindrical guides at each end of the valve body in which the tube 7 slides. Pistons 9 of Figure 1 are replaced by end plates 9 which have connections 11 for the admission of compressed air as before for displacing the valve body and also the matrix which is incorporated with it.

The operation of either form is as follows: the hot, heat releasing gas is led to the annular chamber D through inlet $d$ and then enters the matrix via inlet ports $p$ and after an appropriate portion of its heat has been absorbed by the matrix, it leaves the casing, cooled, through the annular chamber B and outlet $b$. The cold gas to be heated enters the annular chamber A through inlet $a$ and, after the valve body has been changed over or displaced to its opposite position, flows through the matrix in a direction opposite to that of the hot gas stream of the previous period, and leaves the casing 1, heated through the annular chamber C and outlet $c$.

This arrangement is such that the temperatures caused by the gases increase in a steady sequence from A through B and C to D, that only one temperature prevails in each cross-section of the casing, that all the sealing surfaces have unbroken circular contours, that the gases exert no resultant pressures on the valve body or the sealing surfaces, that the only vertical load acting on the sealing surfaces is that due to the weight of the valve body, which results in only a very small load on the sealing surfaces and which, under certain conditions, can be eliminated by guiding and centering the valve body by means of the comparatively cold control mechanism or by arranging the valve body vertically, that the matrix can be reversed from one gas side to the other in a very short time which is independent of the period for which the matrix must be subjected to the gas stream and that the sliding length resulting is independent of the frontal cross-section of the matrix and can be kept very small.

Figures 3, 4, 5:
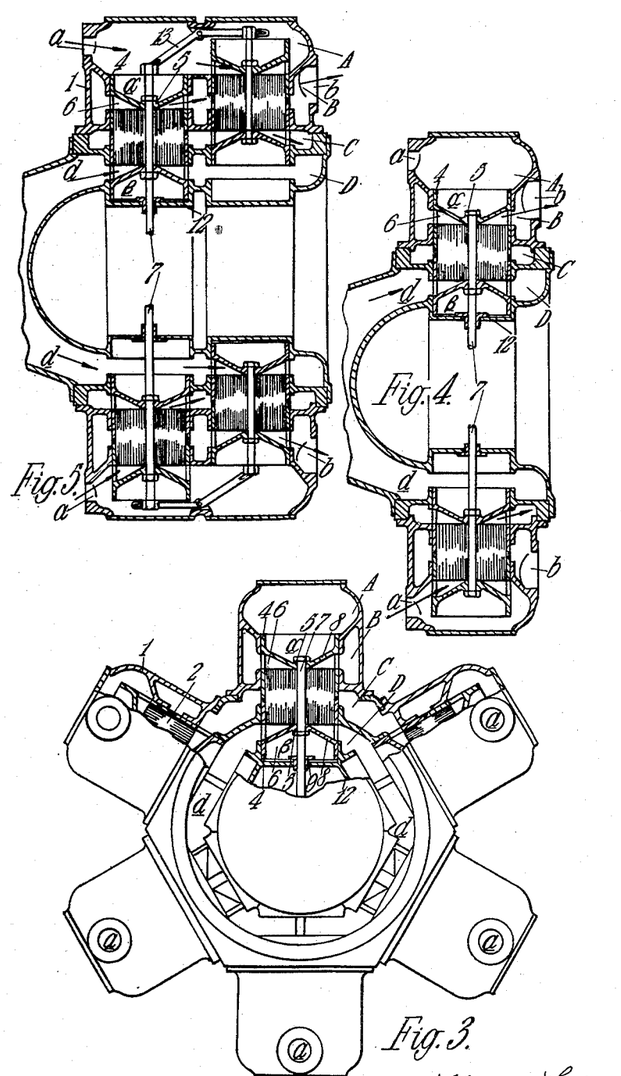
Figure 3 shows an arrangement with end plates integral with a movable valve body.
Figure 4 is a side elevation of Figure 3.
Figure 5 is a side elevation of a modification of Figure 3.

A further reduction of the space between the matrix and the sealing surface, which space governs the extent of the changeover losses, can be achieved in accordance with the invention by not making the conical end-plates 8 in Figure 2 stationary, but integral with the movable valve body, as shown in the arrangement in Figure 3. The valve body enclosing the matrix 2 and preferably subdivided along its length, consists in this case of two practically identical halves α and β bolted together by means of a central bolt 7 and centered with respect to one another at the outside ring 4. End walls 8, stiffened by ribs 6, close the valve body at both ends and form a component of the same. Between the conical end walls 8 and the cylindrical matrix carrier there is a continuous annular port which is only interrupted by single bridge-pieces and through which the heat-exchanging gases can flow in and out with but small pressure-loss. The ribs 6 are shaped so that the matrix 2 rests on them without their appreciably obstructing the frontal area of the matrix.

The gas pressure prevailing in the chamber A exerts in this case an axial thrust on the valve body. This thrust is compensated for example by building the valve casings radially on a centrally arranged hot gas duct and operating the two opposite valve bodies in opposition to one another by a drive arranged in hub 12, which drive may for example be a cam drive.

Referring now to Figures 3 to 5, Figure 4 as stated is a side elevation of the arrangement in Figure 3 just described, while Figure 5 is a side elevation of a similar arrangement to that shown in Figure 3 in which the axial thrust is compensated by two valve bodies accommodated in a double casing 1 and connected through a lever 13. Compared with the arrangement shown in Figure 4, this has the advantage that it enables a matrix of twice the frontal area to be accommodated in a heat exchanger of the same cross section and provides a more even flow of the gases since they can flow continuously instead of periodically. The drive may in this case be advantageously performed through the lever 13.

The flow of gases through the matrix is the same as previously described except that in the arrangement shown in Figure 5 whilst the cold high pressure gas flows through the matrix of one cylinder the hot low pressure gases are flowing through the adjacent cylinder and vice versa after the valve bodies have changed over.

Figure 6:
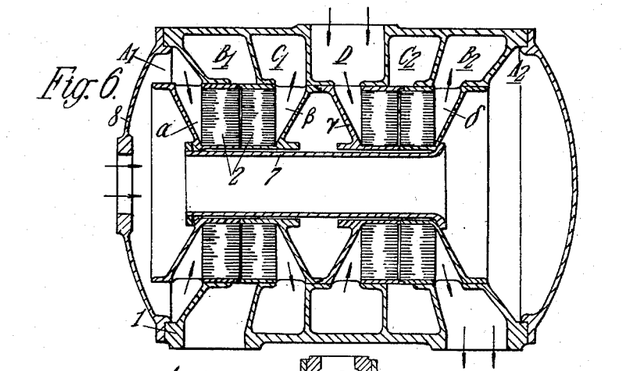
Figure 6 shows a form in which several matrix portions are disposed in one valve body.

A specially advantageous means of carrying out the idea underlying the invention is characterised by the arrangement of several matrix portions in one valve body. A preferred form is one in which the matrix bodies are combined in pairs and accommodated in a casing having in its middle one annular chamber for receiving the heat releasing gas and a chamber at each of its ends for receiving the heat absorbing gas. Such an arrangement, shown in Figure 6, is particularly advantageous because the heat exchanging gases flow into and out of the casing in a sequence such that the two ends A1 and A2 are cold, and the temperature builds up symmetrically from them towards the middle. In addition, full thrust compensation is achieved, and the two cold ends enable the matrix carrier to be satisfactorily centred and lubricated. The tube bolt 7, open at both ends, is used for assembling the matrix carrier built up from four practically identical parts α, β, γ, δ, and provides an unimpeded passage for the gases from one end chamber to the other during the change over, beside requiring an entrance for the fluids to be heated in only one of the two end discs 8 and leaving the opposite disc free for a change-over mechanism to be described later.

Figure 7:
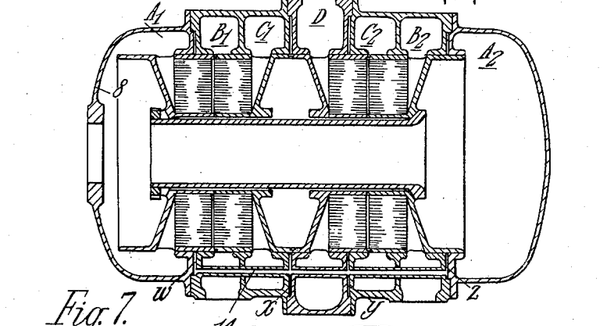
Figure 7 shows an arrangement for reducing loss by using annular gaps.

The quantity of gas contained under pressure in the matrix carrier expands without doing work, and this causes the change-over loss. By the present invention, this loss can be reduced by providing, in the separating walls between the annular chamber A and B, and C and D, gas passages in the form of single ports or, as shown in Figure 7, in the form of annular gaps $w$, $x$, $y$, $z$, these being connected with each other for example, by a number of pipes 14 distributed over the circumference. The result of this is that during the change over, at a time when all gas inlets and outlets of the matrix carrier are closed, the two sides of this carrier are in communication for a short time, so that the pressures in them are equalised at an average level. When a new end position is reached, a workless expansion in the portion of the matrix connected with the low pressure side takes place only from this average pressure level, whereas the parts of the matrix in communication with the high pressure side are filled to the pressure prevailing there direct from the average level.

A further gain can be achieved by providing separate interconnections for annular gaps $w$ and $z$ in communication with the cold sides of the regenerator and for annular gaps $x$ and $y$ in communication with the hot sides.

Figure 8:
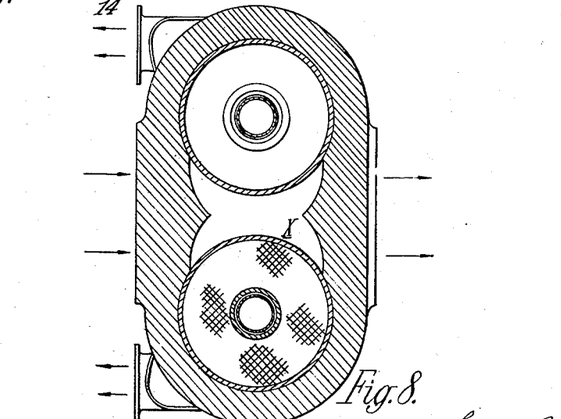
Figures 8 and 9 illustrate a reciprocal twin arrangement.
Figure 9:
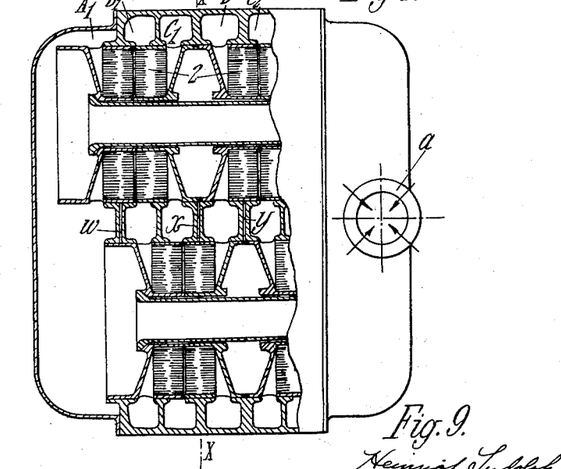

The idea underlying this last part of the invention can be carried out with particular advantage by adopting the reciprocal twin arrangement shown in Figures 8 and 9. In this case it is only necessary to have short, straight gas passages $w$, $x$, $y$, $z$, in the walls separating the gas chambers A and B and C and D respectively, in order to provide rapid and separate pressure compensation on the hot and cold gas sides during the change over.

The change-over mechanism may be according to the invention arranged so as to provide a rapid change over, exactly defined in terms of space and time, of the matrix carrier from one end position to the other, while at the same time impeding as little as possible the possibility of freely moving and adjusting the matrix carrier in its sliding surface. The drive may be hydraulic, pneumatic, electrical or mechanical, or a combination chosen from these or it may be any other suitable drive.

Figure 10:
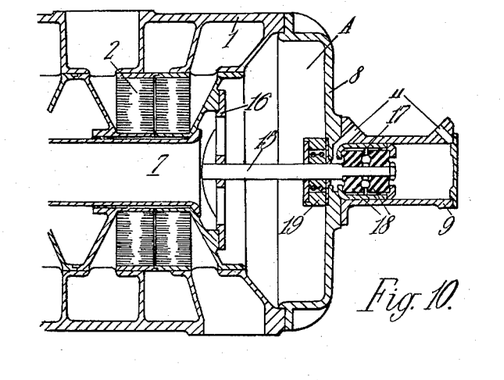
Figure 10 shows a method of connecting a control piston with a matrix carrier.

In Figure 10 a control piston 17 for affecting the drive is connected with the matrix carrier through cylindrical rod 15, and spider 16 which allows the gas to flow unimpeded through the tube bolt 7. The control piston is made so as to allow a limited displacement of its outside surface relatively to the bolt 15, a displacement sufficient to allow for the alteration in eccentricity resulting from the wear of the matrix carrier during service. This is achieved, for example, by securing the outside wall of the control piston to the rod 15 by means of cylindrical rubber bodies 18 which allow sufficient freedom of movement to the rod and ensure adequate damping when the end position is reached. The eccentricity of the matrix due to the original clearance is allowed for by suitably adjusting the control cylinder 9 on the end cap 8. The control cylinder is sealed from the annular chamber A by means of a carbon ring gland 19, the packing of which is freely displaceable in the radial direction, and can be fed alternately by compressed air through one of two unions 11, for changing the matrix carrier over from one gas side to the other.

Figure 11:
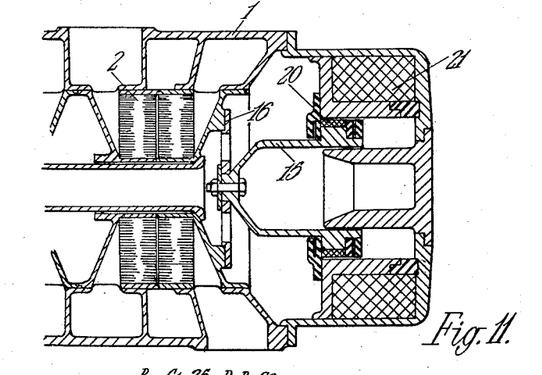
Figures 11 and 12 show respectively examples of an electrical and a pneumatic drive.

In the electrical change-over arrangement shown in Figure 11 a cylindrical body 15 secured to a spider 16 has an electromagnetic coil 20 fitted on its largest circumference. A periodic reversal of the polarity of this coil which projects into the magnetic field of a permanent magnet or an electromagnet 21 imparts a reciprocating movement to the coil body 15 and hence to the matrix carrier.

Figure 12:
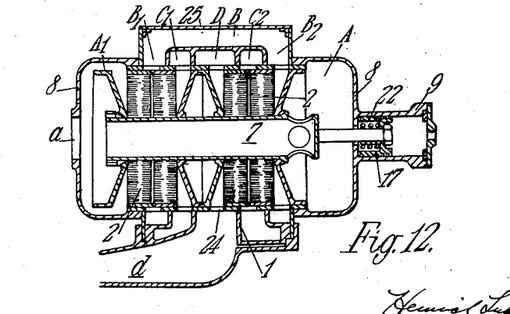

The pneumatic control arrangement shown in Figure 10 can be simplified by omitting carbon ring seal 19. In this case as illustrated in Figure 12, an outwardly directed force acts continuously on control piston 17 during operation, the magnitude of this force depending on the cross section of the piston and the working pressure in the annular chambers A1 and A2. A helical spring 22 is incorporated in order to ensure a sufficient thrust even at low working pressures or when the plant is being started. In this case a periodic change of the pressure on the outside of the control piston is sufficient to reverse the matrix carrier. When this control arrangement is used for fairly small units, for which it is specially intended, the demands with regard to the possible displacement of the control piston parallel with its axis are so small that the cylinder 9 can be rigidly connected to the end plate 8, and a rigid type of control piston can be sufficiently sealed by piston rings, even when its clearance is such as to allow for the maximum eccentricity.

In many cases space is saved and the compressed air ducting simplified by arranging the control mechanism and the cold fluid intake to the regenerator on the same side. In this case, illustrated by the example in Figure 13, the same principle as before can be adopted, but it is an advantage to make the control piston 17 stationary and lead the compressed air in through its support 23, and to secure the cylinder 9 of the control mechanism to the tube bolt 7, of the matrix carrier or make it a part of the latter.

Figure 13:
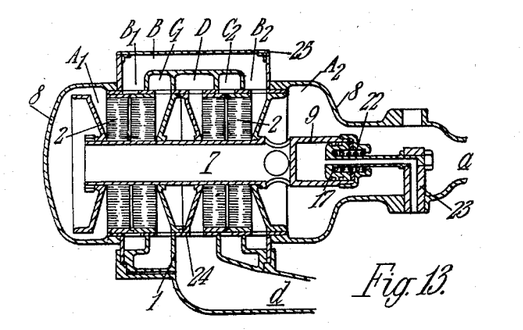
Figure 13 illustrates a form with control mechanism and cold fluid intake on one side of the regenerator.

A specially light construction of the regenerator is obtained according to the invention by using the form of casing shown in Figures 12 and 13. The feature of this casing is that it extends only over the three central hot annular chambers and a liner 24 projects from this casing at both ends. In this case, both projecting ends of the liner terminate at each side after a row of ports from which the cooled medium flows, in clamp connections or screw fastenings to which domed end caps 8 are fitted which form the annular chambers A. A sheet metal jacket 25 forming the annular chamber B is clamped between the domed end caps 8.

This arrangement is specially suitable for combining several of these regenerators in a single casing.

Figure 14:
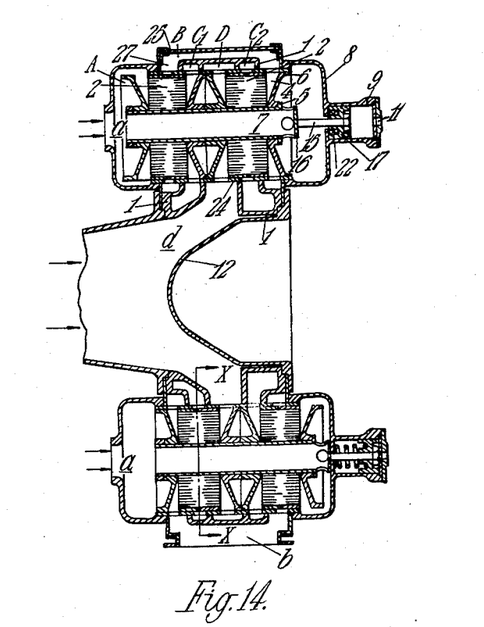
Figures 14 and 15 illustrate the combination of several regenerators in a single casing.
Figure 15:
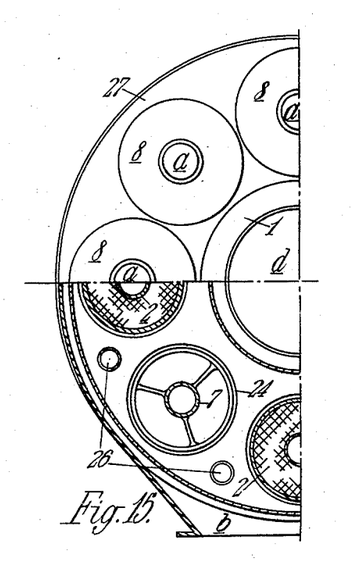

As shown in Figures 14 and 15 a number of matrix carriers are arranged on an annulus the heat releasing gas enters through opening $d$ and flows in a radially outward direction.

The annular chambers C1 and C2 are formed as shown in Figures 12 and 13 on either side of the annular chamber D and are interconnected by pipes 26. The heated gas in the chambers C1 and C2 can be withdrawn at some suitable point (not shown) on the circumference.

A special feature of this type of regenerator is that the number and position of the points at which the heat absorbing gas is tapped after it has been heated does not affect the symmetry of the temperature distribution in the regenerator casing. A specially suitable type of discharge is obtained by omitting the matrix carrier in one of the liners 24, and arranging ports in the planes of the annular chambers C1 and C2 only, so that the said heated gas in the regenerator flows continuously into this liner and can be discharged from one of its end caps. In this case this gas has to be additionally heated by one or more combustion chambers, the invention provides for fitting these in the regenerator casing in place of one or more matrix carriers.

The casing 1 is preferably surrounded completely by an insulating sheet metal jacket 25, which can be used at the same time for collecting the heat releasing gas flowing from the regenerator, which gas is then led off through the flange $b$. The intake for the heat absorbing gas, and the control mechanism of one of the types described above, are connected to the end caps 8 projecting from the sheet metal jacket.

Figure 16:
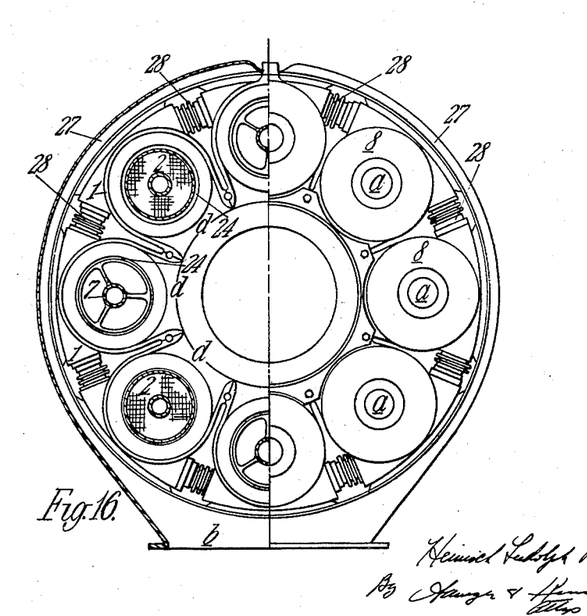
Figure 16 shows a form with subdivided casing.

In cases involving fairly large quantities of gas, it is advisable to subdivide the casing, this being done preferably as shown in Figure 16. Here the casing 1 is shaped so as to form a separate housing for each regenerator body the inlet ports $d$ of which, for the heat releasing gas, are arranged so that they combine to form a circular opening to which the pipe conveying the heat releasing gas is connected. The cooled heat releasing gas collects in a double-walled shell 27 between walls 26 and casing 1, surrounding, and at the same time insulating the regenerator, and is drawn off through the flange $b$. The chambers C1 and C2 of the casing are joined up at their outside circumference by flexible interconnections 28, thus forming two closed ring conduits from which the heat absorbing gas is drawn off at some suitable part of the circumference.

Figure 17:
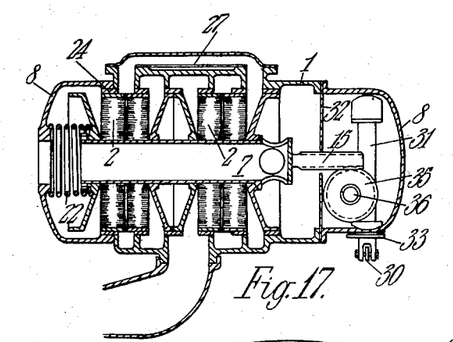
Figures 17 and 18 illustrate a typical cam shaft drive with reduction gear.
Figure 18:
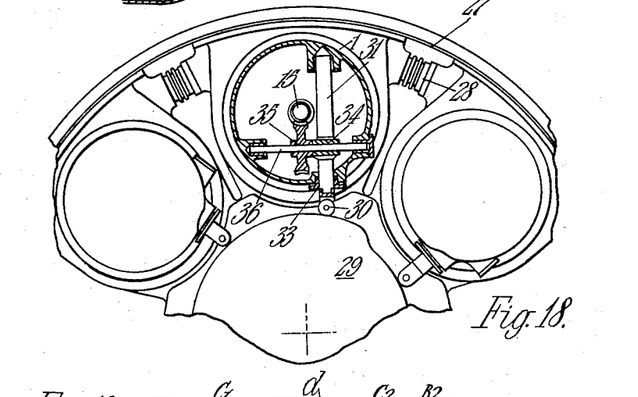

As a typical drive for the composite drum-shaped regenerators described above the invention provides for a cam-shaft drive with reduction gear, as shown in Figures 17 and 18. A cam-plate 29 having a single cam extending over 180 degrees is mounted co-axially with the centre line of the regenerator casing. On to the cam plate are pressed guide rollers 30 to which push rods 31 are secured. Each of the push rods 31 is supported and capable of moving in an end cap 8 screened off from the casing by a shield plate 32, and its passage through the cap is sealed by means of a stuffing box 33. Over an appropriate length the push rod 31 is provided with lateral teeth which engage in a pinion 34 on shaft 36 to which is centrally fixed a gearwheel 35. This gearwheel intermeshes with parallel grooves on cylindrical pin 15 attached to the tube bolt 7. A helical spring 22 which, in Figure 17, is fixed to the end of the matrix carrier opposite to the drive and which, alternatively can be also arranged co-axially with the push rod 31 acts in conjunction with the thrust given by the working pressure on the cross sectional area of the push rod to keep the guide roller 30 in contact with the cam plate 29. The height of the cam on the cam plate corresponds to the movement of the matrix carrier reduced by the diameter ratio pinion 34 to gearwheel 35.

The invention provides for the use of an odd number of matrix carriers so that two matrix carriers are not being operated simultaneously as this might lead to undesirable fluctuations in the gas streams.

As the result of the arrangement described, all the matrix carriers of one half of the regenerator are in one end position and all the matrix carriers of the other half of the regenerator in the opposite end position. The gas conduits can be utilised to better advantage by mounting concentrically and alongside each other two cam plates the cams of which are displaced relatively to each other and each of which operates a suitable proportion of the control mechanisms.

For matrix carriers of fairly small dimensions the clearance necessary for ensuring satisfactory sliding in the surrounding liner or casing is so small that sufficient sealing is achieved without the need of special measures for the purpose even where the distance between adjoining ports is comparatively small. Sealing can, however, be improved by coating the matrix carrier with a suitable lubricant, in particular, a paste containing graphite. A special feature of this invention is that it ensures the even distribution of this film of lubricating and sealing material over the surface of the matrix carrier by slowly rotating the latter.

Figure 19:
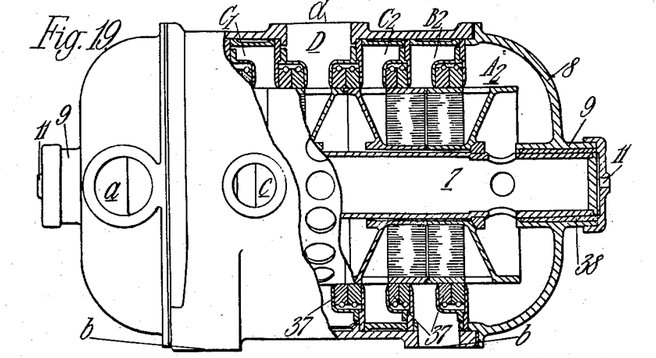
Figure 19 shows means for sealing matrix carriers of large diameter.

Larger volumes of gas usually involve increasing the diameter but not necessarily the length of the matrix carrier, and this in turn involves increasing the clearance of the matrix carrier in the casing, but not the length of the sealing surface. Because of this fact, matrix carriers of fairly large diameters call for special measures for sealing. A specially effective arrangement for this purpose is shown in Figure 19. Its feature is that, in all the sealing planes, stationary sealing rings 37 are provided the inside of which slide on the matrix carrier and which are radially displaceable in the chambers surrounding them. The matrix carrier is centered by means of the bushes 38 arranged at its two cold ends in which the tube bolt 7 slides.

Figure 20:
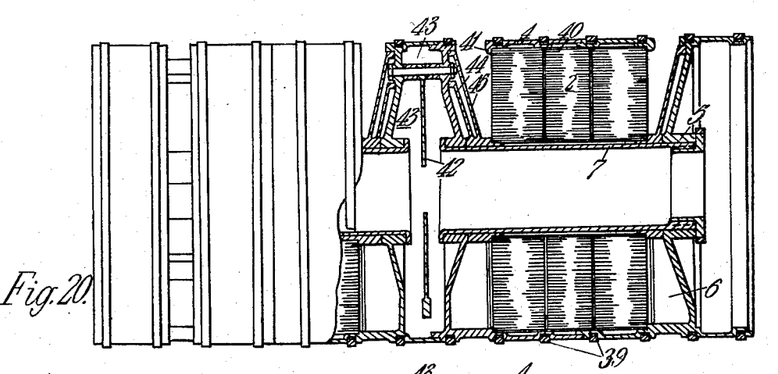
Figure 20 illustrates a piston ring form of matrix seal.
Figure 21:
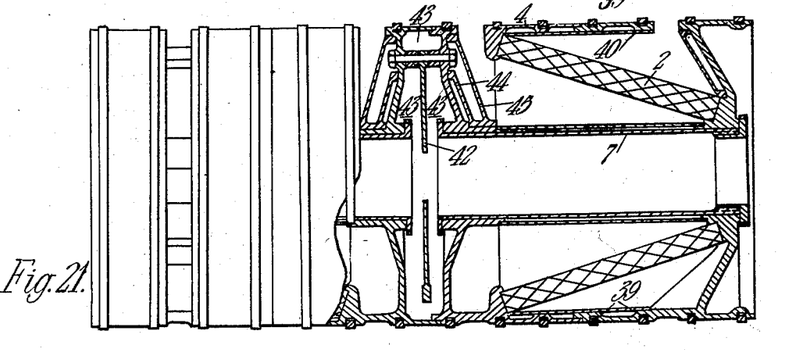
Figure 21 shows a modification of Figure 20 in which the matrix is in the form of a cylinder or cone through which the gases flow substantially radially.

Another effectual method of sealing the matrix carrier is based on the use of piston rings 39 accommodated, as shown in Figures 20 and 21, in the outside jacket of the matrix carrier so that a pair is located between every two adjoining rows of ports in the surrounding casing. These rings are made preferably of self-lubricating materials or are metallic rings with graphite inserts.

Where a matrix carrier having a smooth cylindrical surface is used, the ports in the carrier and the surrounding casing can be designed as continuous annular gaps. On the other hand, when stationary sealing rings secured in the casing are used, the gas passages in the matrix carrier, and, where piston rings sliding with the matrix carrier are used, the ports in the casing take the form of round, rectangular or triangular openings having bridge pieces along which the ring seals can slide. In the latter case it is preferable to use a liner in which carefully rounded ports are cut and which is then pressed into the casing. The pitch of the ports is preferably chosen to be at least twice the width of the ports thus ensuring that a direct connection between high and low pressure sides never occurs. In the case where a regenerator plant comprises a few regenerator units only the pitch may be chosen to be less than twice the width of the ports to smooth the fluctuation in the gas flow during change over.

Where large quantities of gas at high maximum temperatures have to be dealt with, the whole of the sliding surface of the regenerator is in accordance with the invention kept at an average temperature level which ensures effective lubrication and sealing. For this purpose the annular chambers C and D are provided with heat insulation on their insides. In addition, cooling fins or cooling jackets can be provided on the outside of the casing 1. Furthermore, the matrix is arranged in the matrix carrier so that only a small amount of heat can flow into the walls of the matrix carrier, this being achieved, for example, and as shown in Figure 20, by accommodating the matrix in a thin-walled cylinder 40 dimensioned so as to leave a heat-insulating air gap between it and the matrix carrier 4. When the matrix is built up of a system of channels parallel to the centre line, the matrix itself can be used for purposes of insulation by sealing the rows of channels near the wall from the heat absorbing gas leaving the matrix by means of lips 41 on matrix carrier 4. The matrix may, as shown in Figure 21, be built up in the matrix carrier in the form of a cylinder or cone through which the gases flow almost radially, the heat releasing gas flowing from inside outwards, and the heat absorbing gas from outside inwards. In this way the whole of the cylinder jacket of the matrix carrier 4 acting as a sliding surface is kept at the lower temperature level of the regenerator. The middle portion of the matrix carrier is protected from the hot gas by insulation on one side and cooling on the opposite side. This cooling is conveniently effected by interrupting the central tube bolt 7 in the middle, and introducing between the two halves of the matrix carrier a disc 42 which deflects cold air from the tube passage of central tube bolt 7 into space 43 thus keeping the central sliding portion of the matrix carrier cool. Walls 44 and 45 separated by insulating air prevent heat transfer from the outlet duct of the heat absorbing gases.

The two matrix carriers shown in Figures 20 and 21 contain matrices of widely differing characteristics which are but two of the almost unlimited range of matrix forms which this type of regenerator permits. The matrix of Figure 20 is characterised by a considerable depth and relatively small entrance area as required by a matrix forming straight smooth channels given for example by tube bundles or corrugated sheet arrangements. The matrix of Figure 21 is characterised by a small depth and a considerable entrance area as required by a matrix forming irregular rough passages as produced by wire mesh or granular, possibly ceramic, packings.

A further desirable feature obtainable with the matrix arrangement of Figure 20 is the subdivision of the matrix into successive discs which produces two advantages, namely a decrease of heat conduction along the matrix and a possibility of using different materials and channel dimensions on the hot and cold ends of one matrix block in a simple way.

Figure 22:
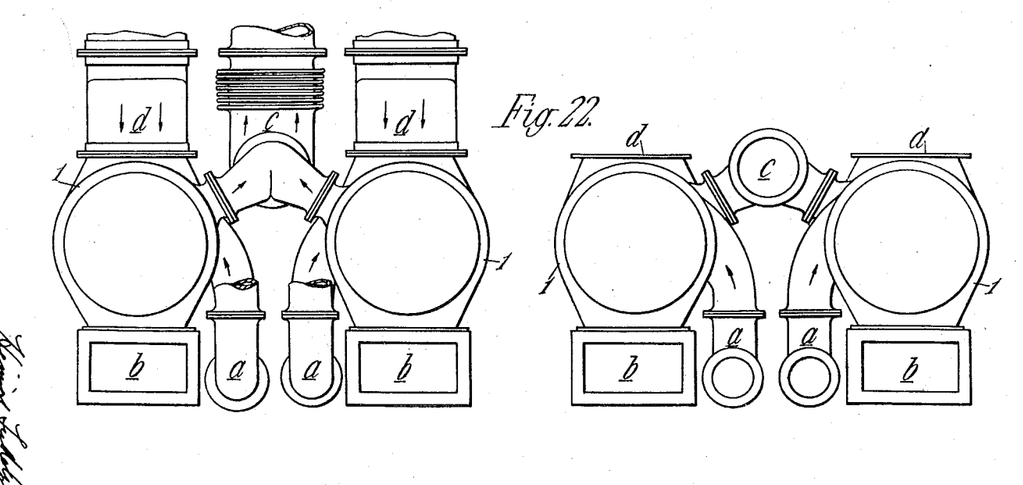
Figures 22 and 23 show a regenator plant having matrix carriers of the type shown in Figures 20 and 21.
Figure 23:
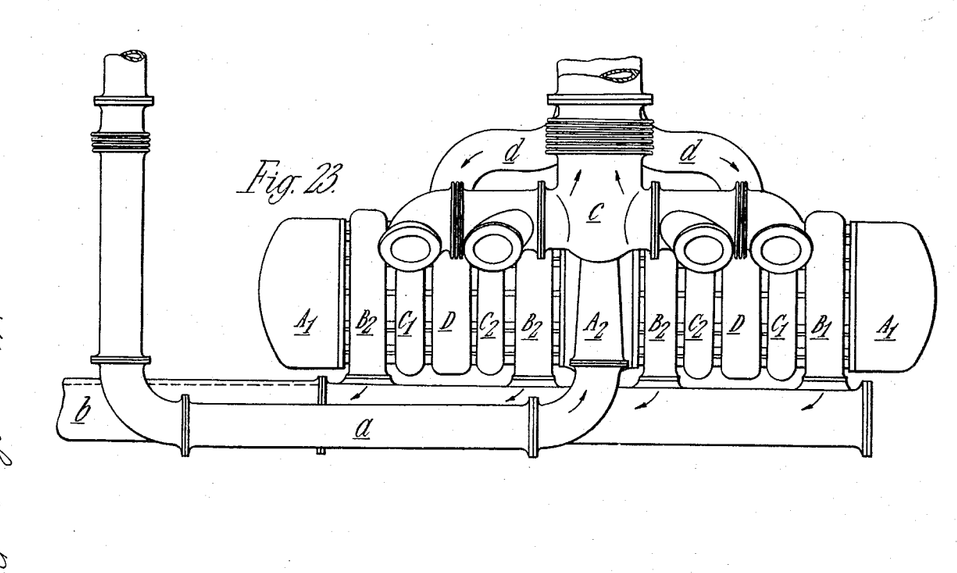

A regenerator plant having matrix carriers of the type described is shown in Figures 22 and 23. It consists of several cylinders arranged parallel to each other, each containing two twin matrix carriers. The cold compressed gas flows into the plant through four ducts $a$ and leaves it heated, through two ducts $c$. The incoming hot gas flows through oblong ducts $d$ and, cooled, is led to the stack, through four ducts $b$.

That portion of the idea underlying the invention and hitherto referring exclusively to regenerators with a moving matrix, based upon combining two regenerators in such a way that the valve body has a hot middle portion and two cooled ends with the aid of which its movement is controlled, may be applied with equal advantage to the regenerator with stationary matrix shown in Figure 1. Similarly, the idea underlying the invention may be extended to provide for the use of two end caps as cold gas chambers connected together by a central duct, this being achieved for example, by the arrangement shown in Figure 24.

Figure 24:
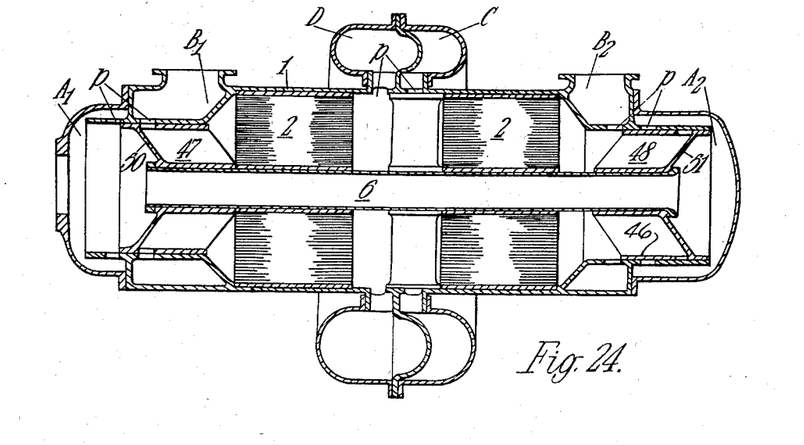
Figure 24 illustrates a form using two end caps as cold fluid chambers connected by a central duct.

In the casing 1 are accommodated two stationary matrix bodies 2 between and at the ends of which two rows of ports $p$ are arranged, one row of which, in turn, is closed by sleeve valve 46 fixed to the tube bolt 7 passing through the two matrix bodies. At its ends the tube bolt carries two identical but opposite valve bodies 47 and 48, the end walls of which 50 and 51 respectively prevent air in spaces A1 and A2 from entering the matrix through the valve body. The ports $p$ in the cylindrical casing portions 1 surrounding these valve bodies are arranged so that in one of the end positions the cooled gas can flow from the matrix bodies on both sides into the annular chambers B1 and B2, while in the other end position the gas to be heated can flow from the two end chambers A1 and A2 into the matrix bodies. In this arrangement the middle portion of the valve is preferably larger in diameter than the end valves as it has twice the gas flow and this is at higher temperatures. All the measures described above with regard to sealing, reduction of change-over losses, heat insulation, and other factors can be applied to this type of regenerator.

As twin regenerators of this type are totally connected to either the high pressure or the low pressure side during a change-over period, the regenerators belonging to a plant can be controlled so that the gases at the lower level of pressure have a greater cross sectional area available for them than the gases at the higher level of pressure, this arrangement being particularly valuable in large gas turbine plants for which this type of regenerator is particularly suitable, since they are operating at constant load during the major portion of their working period. One particular advantage of this type of regenerator is that the proportion of the regenerators in communication with the high and low pressure sides can be adapted to the particular pressure ratios obtaining without interruption in working.

Figure 25:
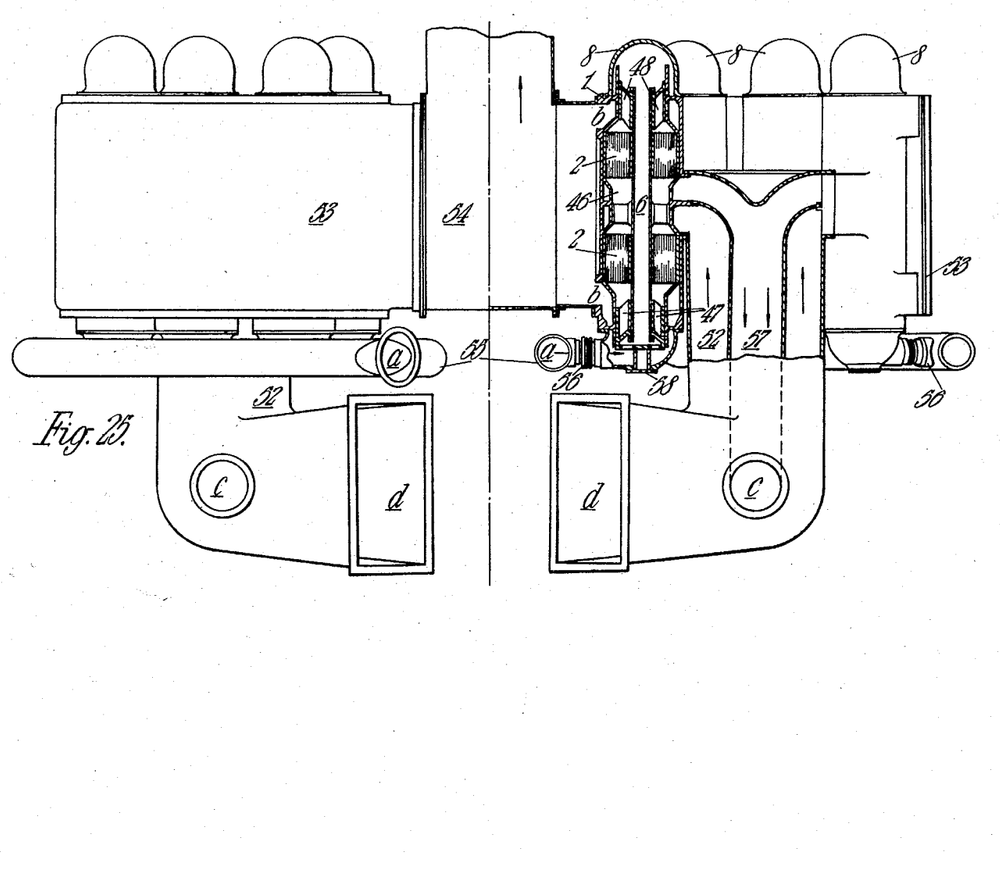
Figure 25 shows a heat exchanger plant with regenerators in a vertical arrangement.

Figure 25 shows a heat exchanger plant incorporating regenerators of this type in which even the load exerted on the sliding surfaces by the weight of the valve bodies is avoided by the vertical arrangement of the centre lines of the two groups each comprising seven regenerators. The hot gas exhausting for example from a marine propulsion gas turbine installation passes through two oblong flanges $d$ and adjoining pipes 52 and centrally into two regenerator drums, and after having given off a portion of its heat to the eight regenerators connected to the low pressure side, collects in surrounding casing 53 and is led to funnel 54. The fresh gas coming from the compressor passes through the flange a into ring ducts 55 and then flows through flexible interconnections 56 into the lower end caps of the six regenerators which are at this time connected to the high pressure side where it is heated and then flows into duct 57, whence it is fed through the flanges c to the combustion chambers. The regenerators are reversed by means of hydraulic cylinders 58 built into their lower ends.

Figure 26:
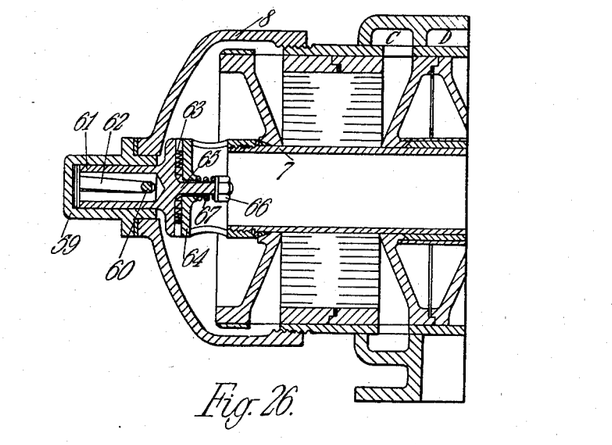
Figure 26 shows a method of imparting rotary motion to the valve arrangement.

Figure 26 shows an arrangement for imparting rotary motion to the matrix carrier. A cylinder 59 is fixed to end cover 8 and contains at one of its ends a fixed rod 60. Sliding in the cylinder 59 is a piston 61 containing two diametrically opposite slots 62 cut at an angle to the axial direction in which the rod 60 slides. On the inward facing end of the piston 61 are cut teeth 63 which may engage with similar teeth cut in the end plate 64 tube bolt 7. An extension 65 of piston 61 passes through a clearance hole in end plate 64 and has at its inner end a nut 66 which presses on spring 67 between it and the end plate 64.

The action of the mechanism is as follows: When the piston or matrix carrier moves to the right in the figure shown the teeth in end plate 64 disengage from the teeth 63 in piston 61 against the action of spring 67 which is a light spring. The piston 61 is also displaced towards the right but causes no rotary movement in view of the disengagement of the teeth 63 and their counter parts on end plate 64. When the matrix carrier is displaced towards the left the teeth are engaged and the movement of slots 62 over fixed rod 60 causes a rotary movement of piston 61 and hence of the matrix carrier.

I claim:

1. A regenerative heat exchanger comprising two heat-storing matrix elements, a housing therefor having opposed end regions and an intermediate region therebetween, the matrix elements being spaced apart on either side of the intermediate region, sleeve valve means to control the flow through said matrix elements of relatively hot and cold fluids between which heat exchange is to occur, end fluid inlet and outlet means at the end regions of said housing, intermediate fluid inlet and outlet means at the intermediate region of said housing, first flow-path means for the hot fluid extending in a general direction from said intermediate inlet means, through at least one of said matrix elements, to at least one of said end outlet means, a second flow-path means for the cold fluid extending in a general direction from at least one of said end inlet means, through at least one of said matrix elements, to said intermediate outlet means, and operating means operable to change the relative positions of said sleeve valve means and said matrix elements to permit flow of hot and cold fluid alternately through the matrix elements.

2. A regenerative heat exchanger as claimed in claim 1, in which the matrix elements are of annular form, are arranged co-axially with each other and are spaced apart in the direction of their common axis and in which the sleeve valve means is also positioned co-axially with the matrix elements.

3. A regenerative heat exchanger comprising two heat storing matrix elements, a housing therefor having opposed end regions and an intermediate region therebetween, the matrix elements being of annular form, arranged co-axially with each other and spaced apart on either side of the intermediate region in the direction of their common axis, a sleeve valve positioned co-axially with the matrix elements to control the flow through said matrix elements of relatively hot and cold fluids between which heat exchange is to occur, end fluid inlet and outlet means at the end regions of said housing, intermediate fluid inlet and outlet means at the intermediate region of said housing, and means for reciprocating said sleeve valve to permit the flow of hot and cold fluid alternately through the matrix elements, first flow-path means for the hot fluid extending in a general direction from said intermediate inlet means, through at least one of said matrix elements, to at least one of said end outlet means and second flow-path means for the cold fluid extending in a general direction from at least one of said end inlet means, through at least one of said matrix elements, to said intermediate outlet means.

4. A regenerative heat exchanger in accordance with claim 3, in which in addition to said reciprocating motion means for imparting rotary motion are provided.

5. A regenerative heat exchanger in accordance with claim 4, in which each matrix element is in several sections arranged alongside each other in the direction of fluid flow therethrough.

6. A regenerative heat exchanger comprising two heat storing matrix elements, a housing therefor and sleeve valve means arranged to control the flow through said matrix elements of relatively hot and cold fluids, the matrix elements being of annular form, arranged co-axially with one another and spaced apart from each other in the direction of their common axis, the sleeve valve means being positioned co-axially with said matrix elements and comprising a sleeve, portions of which are surrounded by the matrix elements and means for imparting reciprocating and rotary motion to the said sleeve, said housing comprising annular chambers surrounding the said sleeve and end chambers communicating with each other through the sleeve, and a ported cylindrical wall at the inner periphery of said annular chambers and providing sealing surfaces for the sleeve, said sleeve controlling the flow of hot and cold fluid to and from the matrix elements, the arrangement being that annular chambers for receiving hot fluid from the matrix elements or admitting hot fluid thereto are in communication under the control of the sleeve with a space between said matrix elements whilst annular chambers for the receipt of cold fluid from the matrix and end chambers for admitting cold fluid thereto are in communication, under the control of the sleeve, with spaces in contact with faces of each matrix element which are opposed to the faces in contact with the space between the elements, fluid to be cooled in the matrix flowing from the space between said elements, through at least one matrix element in a direction away from said space towards a chamber for receiving said fluid after it has been cooled, whilst fluid to be heated in the matrix elements flows from at least one end chamber, through at least one matrix element in a direction away from said end chamber towards the space between said matrix elements to enter an annular chamber for collecting said fluid after it has been heated, the matrix elements being submitted alternately to the flow of fluid to be heated and fluid to be cooled.

7. A regenerative heat exchanger in accordance with claim 6, in which the regions of the sleeve surrounded by the matrix elements are of smaller diameter than other regions of the sleeve.

8. A regenerative heat exchanger in accordance with claim 7, in which an inlet duct for a fluid to be heated is fitted to one end of the housing whilst a sleeve motivating mechanism is fitted to the opposite end.

9. A regenerative heat exchanger comprising two heat storing matrix elements of annular form spaced apart from each other in the direction of their common axis within a housing, sleeve valve means comprising a sleeve co-axial with said elements and having two regions each surrounded by a matrix element, said regions being of smaller diameter than the other regions of the sleeve, said sleeve being positioned co-axially with respect to the matrix elements, annular chambers surrounding the sleeve, and having inner peripheral walls forming sealing surfaces for the sleeve and end chambers situated at each end of the sleeve and communicating with each other through the sleeve, sealing rings positioned to restrict leakage in an axial direction of the sleeve between said sleeve and said sealing surfaces, and means for moving the sleeve to and fro at regular intervals in the direction of its axis between two positions of rest, the arrangement being that in each position of rest of the sleeve, flow of fluid is permitted so as to submit each matrix element to the flow of hot and cold fluid alternately, fluid to be cooled being admitted to at least one matrix portion from one of said annular chambers disposed so as to surround the space between the matrix elements, said fluid being caused to flow through a matrix element in a direction away from said space towards an annular chamber adjacent an end chamber, and fluid to be heated flowing from at least one end chamber through at least one of the matrix elements in a direction away from said end chamber towards an annular chamber adjacent the chamber from which fluid to be cooled is admitted.

10. A regenerative heat exchanger in accordance with claim 9 in which radially extending deflecting vanes are arranged in intermediate portions of the sleeve so as to direct cold fluid, flowing through the sleeve between each end chamber, into contact with the intermediate sealing surface of the sleeve.

11. A regenerative heat exchanger comprising a housing, sleeve valve means, including a sleeve, and a heat storing matrix, said housing comprising a plurality of annular chambers the inner peripheral walls of which form a continuous ported cylinder which cylinder forms a sealing surface for the sleeve, and end chambers located at each end of said sleeve and in communication with each other through the sleeve, the arrangement of said chambers in the axial direction of the sleeve being an end chamber, to which fluid to be heated is admitted, an annular chamber for collecting the fluid which has been cooled in the matrix, an annular chamber for collecting fluid that has been heated in the matrix, an annular chamber to which fluid to be cooled is admitted, an annular chamber for collecting fluid that has been heated in the matrix, an annular chamber for collecting fluid that has been cooled in the matrix and an end chamber to which fluid to be heated is admitted, fluid inlet means, for fluid to be heated, associated with one end chamber and with the annular chamber for admitting fluid to be cooled to the matrix, fluid outlet means associated with each of the other annular chambers and sleeve valve motivating means fitted to the end chamber opposite the end chamber having the fluid inlet means, said motivating means imparting a reciprocating and a rotary motion to said sleeve, said matrix being divided into two matrix elements annular in form, spaced apart from each other in the direction of the axis of the sleeve, and incorporated in said sleeve on either side of an intermediate portion thereof, the region of the sleeve surrounded by the matrix elements being of smaller diameter than the remaining portions of the sleeve, the arrangement being such that each matrix element is submitted alternately to the fluid to be heated and the fluid to be cooled and such that whilst one matrix element is being submitted to the flow therethrough of the fluid to be heated the other matrix element is being submitted to the flow therethrough of fluid to be cooled, said flow of fluid being permitted when the sleeve is at the limit of its axial travel in either direction, the fluid to be cooled flowing through the matrix in an axial direction away from the annular admission chamber for said fluid towards an annular collecting chamber for said fluid and the fluid to be heated flowing through the matrix in an axial direction away from an end chamber towards an annular collecting chamber for said fluid.

12. A regenerative heat exchanger in accordance with claim 11, in which the annular chambers are separated from one another by walls having passages in them which are connected to each other in such a way that during the time when the sleeve is moving from one extreme position to the other in an axial direction, the opposite faces of each matrix element are in communciation with each other.

13. A regenerative heat exchanger plant comprising two or more heat exchangers in accordance with claim 12 connected to common motivating means for simultaneous operation.

14. A regenerative heat exchanger comprising a housing, sleeve valve means and a heat storing matrix comprising two stationary annular matrix elements spaced apart in the direction of their common axis within said housing, the sleeve valve means comprising a sleeve coaxial with said elements and having ported end regions and an intermediate region, the region of said sleeve between said end and intermediate regions being surrounded by the matrix elements, end chambers to which fluid to be heated is admitted, said chambers being in communication with each other through the sleeve, two annular chambers one at each end adjacent the end chambers which annular chambers are for collecting fluid to be cooled after it has been cooled in the matrix, two intermediate annular chambers surrounding the space between the two matrix elements and in communication therewith, one chamber being for the admission of fluid to be cooled and the other for collecting fluid to be heated after it has been heated in the matrix, ported end cylinders in which slide and ported end regions of the sleeve said cylinder ports communicating with the end annular chambers and the end chambers, a ported intermediate cylinder in which slides the intermediate region of the sleeve said intermediate cylinder being in communication through said ports with the two intermediate annular chambers, the intermediate ported cylinder and associated intermediate regions of the sleeve being of larger diameter than the end ported cylinders and associated end regions of the sleeve, fluid inlet means in one chamber and one intermediate annular chamber and fluid outlet means in the other annular chambers, and means for imparting a reciprocating and rotary motion to the sleeve situated at the end chamber opposite the one containing the fluid inlet means, the arrangement being such that when the sleeve is at the limit of its axial travel in one direction, fluid to be cooled is admitted to the space between the matrix elements, and flows through each matrix element in a direction away from said space towards the end annular chambers where it is collected and when the sleeve is at the limit of its axial travel in the other direction fluid to be heated is admitted to each matrix element from the end chambers and flows through said elements in a diretcion away from said end chambers towards the intermediate annular chamber for collecting said fluid after it has been heated in the matrix elements.

References Cited in the file of this patent

UNITED STATES PATENTS

| | | |
|---|---|---|
| Re. 17,577 | Dyrssen | Feb. 4, 1930 |
| 1,845,239 | Colby | Feb. 16, 1932 |
| 2,397,734 | Goebel et al. | Apr. 12, 1946 |

FOREIGN PATENTS

| | | |
|---|---|---|
| 72,769 | Denmark | July 16, 1951 |
| 220,867 | Great Britain | Aug. 28, 1924 |
| 672,994 | Great Britain | May 28, 1952 |